United States Patent [19]

Ericson et al.

[11] 4,114,720
[45] Sep. 19, 1978

[54] DUAL STEERING SYSTEM FOR VEHICLES

[75] Inventors: Hans Göran Ericson; Bo Sanfrid Emanuel Stenerås, both of Eskilstuna, Sweden

[73] Assignee: Volvo BM AB, Eskilstuna, Sweden

[21] Appl. No.: 770,748

[22] Filed: Feb. 22, 1977

[30] Foreign Application Priority Data

Feb. 27, 1976 [SE] Sweden .............................. 7602701

[51] Int. Cl.$^2$ ............................................. B62D 5/06
[52] U.S. Cl. ...................................... 180/133; 60/405
[58] Field of Search .................. 180/133; 60/403, 405; 417/2, 3

[56] References Cited

U.S. PATENT DOCUMENTS

| 3,439,768 | 4/1968 | Medley | 180/133 |
|---|---|---|---|
| 3,730,288 | 5/1973 | Dean | 180/133 |
| 3,896,618 | 7/1975 | Smith | 60/405 |
| 3,905,438 | 9/1975 | Runyon | 180/133 |
| 3,935,918 | 2/1976 | Hicks | 180/133 |
| 3,964,566 | 6/1976 | Smith | 180/133 |
| 3,975,908 | 8/1976 | Smith | 60/405 |

FOREIGN PATENT DOCUMENTS

2,256,860  8/1975  France ................................... 180/133

OTHER PUBLICATIONS

"Offenlegungsschrift 2409207" Lang, Apr. 1975.

Primary Examiner—Joseph F. Peters, Jr.
Assistant Examiner—R. Schrecengost
Attorney, Agent, or Firm—Young & Thompson

[57] ABSTRACT

A dual hydraulic steering system for a vehicle has two steering circuits each having a pump and a steering valve unit. A first circuit is connected to the main working spaces of the double-acting steering cylinders while the second circuit is connected to the piston rod spaces of the cylinders. The first circuit has an engine driven pump while the second circuit has a ground wheel driven pump and an accumulator. Both circuits are connected to a common tank which is divided below a lowest normal oil level. Pressure switches and electromagnetic valves feed flow from the first circuit to the second in case of low pressure therein. This cross-over is prevented when a level switch detects low tank oil level.

4 Claims, 1 Drawing Figure

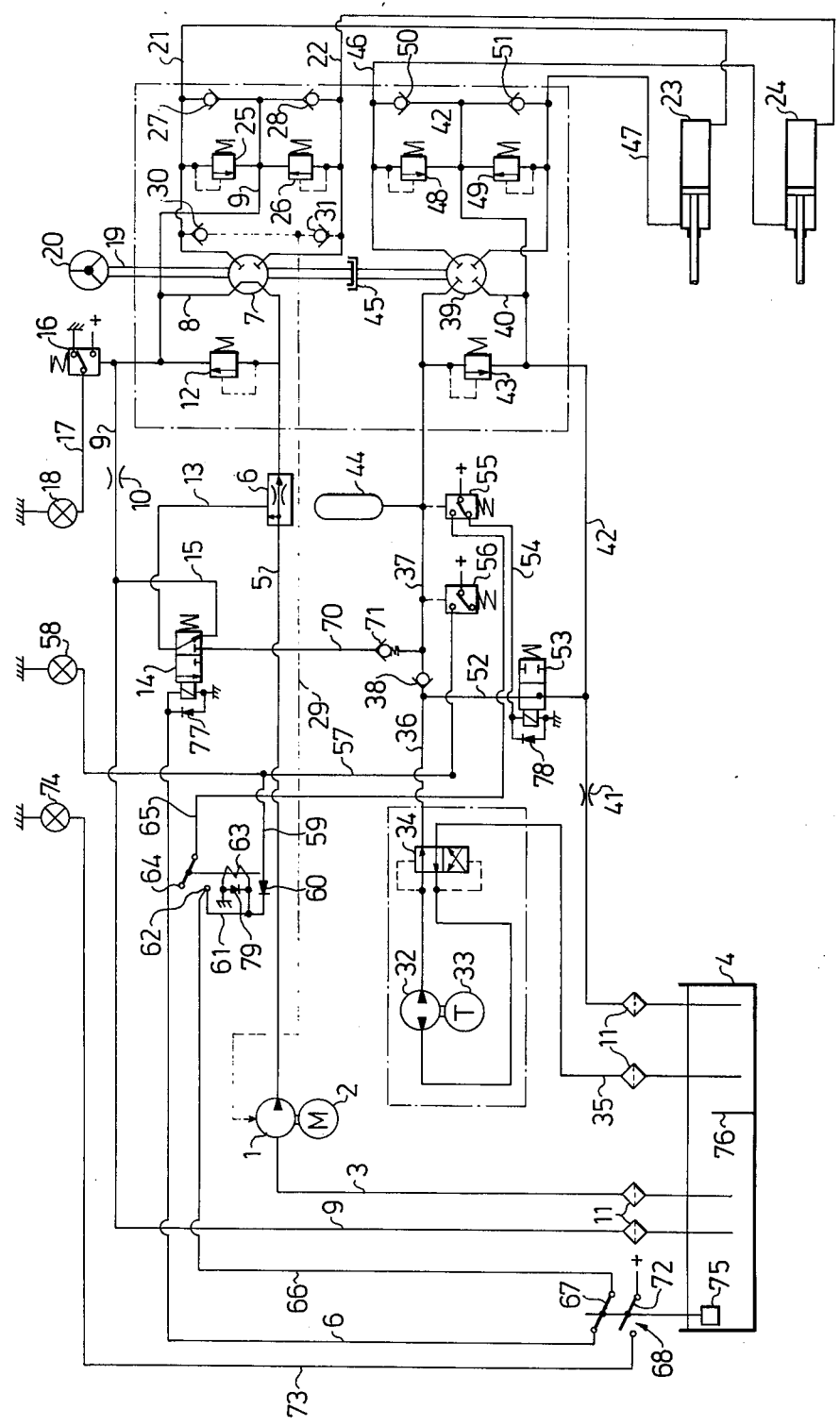

DUAL STEERING SYSTEM FOR VEHICLES

The present invention relates to a hydraulic steering system for vehicles comprising two double-acting steering cylinders operating in opposite directions and two steering circuits, each of which has a pressure medium pump and a steering unit which can be influenced by the steering wheel of the vehicle, to which unit a supply line carrying pressure medium from the pump, a return flow line and two steering lines are connected, each steering line leading to a respective steering cylinder, said steering unit, when the steering wheel is turned, metering out a pressure medium flow, the magnitude of which is dependent on the magnitude of the movement of the steering wheel, to its respective steering cylinder line.

Such a steering system has been proposed for utility vehicles such as road construction and forestry machines in which the steering units are coupled in parallel with each other and are connected to the steering cylinders by means of common supply lines. The forward cylinder space of one steering cylinder is connected to the rear cylinder space of the other steering cylinder, and vice versa.

The purpose of the present invention is to further develop a steering system of the kind disclosed above so that increased operating security is achieved. According to the present invention, this is accomplished by means of a steering system characterized in that the steering cylinder lines in one of the steering circuits are connected to the rear cylinder spaces of the cylinders while the steering cylinder lines in the remaining steering circuit are connected to the forward cylinder spaces of the cylinders, that a first one of the steering circuits has either a steering unit of the open center type or a steering unit of the closed center type in connection with a pump which is regulated in relation to the load, and that the second steering circuit has a steering unit of the closed center type and has an accumulator connected to its supply line.

By means of a steering system designed in this manner and having dual steering circuits, the vehicle also remains maneuverable in the event of line breaks in either of the steering circuits. By means of one of the steering circuits having an accumulator, instantaneous extra flow for rapid steering maneuvers is available, which means that smaller pumps can be used. Operating security for the steering unit is hereby increased simultaneously as costs are reduced.

The pump in the accumulator steering circuit is preferably driven in dependence of the rotation of at least one of the ground wheels of the vehicle, for example by means of transfer from the output shaft of the gearbox. The other first steering circuit can have a pump driven by the vehicle motor.

According to a further development of the invention, there is a coupling valve which allows pressure medium to be fed to the accumulator steering circuit from the first circuit when the pressure in the accumulator circuit falls to below a predetermined value. Said circuit is thereby operable even if its pump is not capable of maintaining required steering pressure.

The coupling valve can preferably be locked in a position separating the steering circuits when the level of the pressure medium in the accumulator steering circuit pressure medium tank falls below a predetermined normal level. In the event of, for example, a line break in the accumulator steering circuit, the loss of pressure medium from the first steering circuit as well is prevented.

An embodiment of the invention is described in more detail below. Reference is made to the accompanying drawing which shows a steering system for, for example, a frame-steered loader.

The steering system shown in the drawing has two steering circuits. A first circuit comprises a pump 1 which is powered by the drive motor 2 of the vehicle. By means of a line 3, the pump 1 draws hydraulic fluid from a hydraulic fluid tank 4 and forces the hydraulic fluid out into a supply line 5. A three-way flow regulator 6 is coupled to the supply line 5. The supply line 5 is connected to a hydraulic steering unit 7 of the open center kind, for example the Danfoss ON type. In the neutral position of the steering unit as shown in the drawing, connection exists between the supply line 5 and the return line 9 connected to the steering unit 7 by means of a line 8. The return line 9 is provided with a restriction 10 in order to improve afterfilling of the cylinders. The return line 9 is connected to the hydraulic oil tank 4 and, like the suction tank 3, provided with a filter 11. An overflow valve 12 is connected between the supply and return line connections of the steering unit 7. Excess flow from the flow regulator 6 is led through a line 13 to a valve 14 which, in its shown normal position, connects the line 13 to a line 15 connected to the return line 9. A pressure guard 16 containing an electric switch is also connected to the return line 9, said electric switch being connected to a warning lamp 18 by means of an electric wire 17. When the pressure guard 16 detects pressure below a predetermined level in the return line 9 upstream of the restriction 10 it connects the warning lamp 18 to a voltage source.

The steering unit 7 is maneuvered by means of the steering column 19 of the steering wheel 20 of the vehicle. When the steering wheel 20 is turned, the steering unit 7 meters out hydraulic fluid from the supply line 5 to either of two steering lines 21 and 22 connected to the steering unit 7, depending on which direction the steering wheel is turned. The line not supplied with hydraulic oil is simultaneously connected to the return line 9 by means of the steering unit 7. The steering lines 21 and 22 are connected to the rear cylinder spaces of the right and left steering cylinders 23 and 24, respectively, of the vehicle. The outlets of the steering unit 7 are protected against pressure shocks by means of shock valves 25 and 26 situated between the steering lines 21 and 22, respectively, and the return line 9. The return line 9 is furthermore connected to the steering lines 21 and 22 by means of non-return valves 27 and 28 opening towards the steering lines. This allows improved afterfilling in the rear cylinder spaces when the steering cylinders 23, 24 are maneuvered from their forward cylinder spaces in the manner described below.

The second steering circuit comprises a pump 32 which is powered by the output shaft on the gearbox 33 of the vehicle. The pump 32 will be driven at different speeds and different directions of rotation depending on the driving speed and driving direction of the vehicle. Thus the pump 32 is connected to a suction line 35 and a pressure line 36 by means of a reversing valve 34, said suction line 35 being provided with a filter 11 and leading to the hydraulic oil tank 4. The pressure line 36 is connected to the supply line 37 of the second steering circuit by means of a non-return valve 38 opening towards said supply line 37. The supply line 37 is connected to a hydraulic steering unit 39 of the closed center type, for example Danfoss type CN. By means of a line 40 the steering unit 39 is connected to a return line 42 leading to the hydraulic oil tank and provided with a filter 11 and a restriction 41. An overflow valve 43 is connected between the supply and return line connections of the steering unit 39. An accumulator 44 is connected to the supply line 37.

The steering unit 39 is maneuvered by means of the vehicle steering wheel 20 and the steering column 19 by means of a slip clutch 45. When the steering wheel is turned, the steering unit 39 meters hydraulic oil from the supply line 37 to either of two steering lines 46 and 47 in a manner corresponding to the arrangement in the steering unit 7, depending on which way the steering wheel is turned. The steering lines 46 and 47 are connected to the forward cylinder spaces of the left and right steering cylinders 24 and 23. In a similar manner to steering unit 7, shock valves 48 and 49 are connected between the steering lines 46 and 47, respectively, and the return line 42 and non-return valves 50 and 51 opening towards the steering lines 46 and 47 are connected between these steering lines and the return line 42.

A line 52 having a magnetic valve 53 is connected between the pressure line 36 and the return line 42 upstream of the restriction 41. The magnet of the magnetic valve 53 is supplied with current by means of an electric wire 54 from a pressure-detecting switch 55 connected to the supply line 37. Said switch is set so that, when a normal operating pressure of between 110 and 140 bar prevails in the supply line 37, the switch connects the magnetic valve 53 to a source of current marked with a plus sign. In this normal position the magnetic valve 53 connects the pressure line 36 to the return line 42. When the pressure in the supply line 37 falls to below a predetermined desired minimum operating pressure, for example 110 bar, the switch 55 is changed over, whereby the magnetic valve 53 is no longer supplied with current and blocks the line 52. Under the precondition that the pressure in the pressure line 36 is greater than the pressure in the supply line 37, the pump 32 supplies hydraulic oil through the non-return valve 38 into the supply line 37.

A second pressure-detecting switch 56 is also connected to the supply line 37, said switch being set to, upon detection of a supply line pressure falling below a lowest allowable value of for example 50 bar, change over and thereby supply current to a wire 57 to a signal lamp 58. A wire 59 connects the wire 57 to the anode of a diode 60, the cathode of which is connected to a contact 62 of a relay 63 by means of a wire 61, the coil of said relay being arranged between the wire 61 and ground.

The movable contact 64 of the relay is connected to a contact on the pressure switch 55 by means of a wire 65, said contact not carrying any current at normal operating pressure in the supply line. A wire 66 runs from the stationary relay contact 62 to a first movable contact 67 of a switch 68. Said switch is designed as a level guard and is influenced by the hydraulic oil level in the tank 4. At the normal oil level in the tank 4, the contact 67 of the switch 68 closes the connection between the wire 66 and a wire 69 which is connected to the electromagnet of the valve 14 designed as a magnetic valve in the connection 13, 15 between the first steering circuit flow regulator 6 and the return line 9. When the magnetic valve 14 is not carrying current, said connection 13, 15 is held open. When the magnetic valve is supplied with current, however, the line 13 leading from the flow regulator 6 is connected to a line 70 which is connected to the supply line 37 of the second steering circuit by means of a spring-loaded non-return valve 71 opening in the direction towards the supply line 37. The line 15 is blocked. The level switch 68 is also provided with a second contact 72 which, at excessively low oil level in the tank 4, supplies a wire 73 to a signal lamp 74 with current, said lamp then lighting when the oil level in the tank 4 has fallen below a predetermined minimum value. Detection of the oil level can be effected in an arbitrary manner and is schematically indicated in the drawing by a float 75. The oil tank 4 is divided into two sections below the level at which the float 75 influences the switch 68. Said division is effected by an intermediate wall 76 and results in the two steering circuits of the hydraulic system being separated at excessively low oil level. If a line breaks in either of the circuits, the above arrangement prevents the emptying of the hydraulic tank of the other circuit.

Diodes 77, 78 and 79 are connected in parallel with the coils of the magnetic valves 14, 53 and the relay 63, the anodes of said diodes being connected to ground.

The steering system described above funtions in the following manner. When the vehicle motor 2 is in operation, the pump 1 of the first steering circuit supplies hydraulic oil to the supply line 5. Under the precondition that the second steering circuit also has operational pressure, excess flow from the flow regulator 6 is led through the line 13, valve 14 and line 15 to the return line 9.

When the vehicle is being driven, the pump 32 of the second steering circuit supplies the pressure line 36 with hydraulic oil, and from said line 36 the hydraulic oil passes through the non-return valve 38 to the supply line 37. When full operational pressure, over 140 bar, has been achieved in the supply line provided with the accumulator 44, the pressure switch 55 is switched to the position shown in the drawing in which the magnetic valve 53 is provided with current and leads the flow from the pressure line 36 through the line 52 to the return line 42. In this manner, use of the overflow valve 43, which like said first overflow valve 12 is set to 145 bar, for normal pressure restriction is avoided. Such use would lead to an undesirable heating of the oil. The non-return valve 38 prevents flowback from the supply line 37.

If the steering wheel is turned for a right-hand turn, hydraulic oil will be metered out to steering lines 21 and 46 by steering units 7 and 39 for hydraulic oil supply to the rear work space of the right-hand steering cylinder 23 and the forward work space of the left-hand steering cylinder 24. The two remaining steering lines 22 and 47 are connected by steering units 7 and 39 to the return lines 9 and 42, respectively. The piston of the right-hand steering cylinder 23 will be pushed outwards and the piston of the left-hand steering cylinder 24 will be drawn inwards.

A left-hand turn entails that the steering units 7 and 39 reverse the supply to steering lines 21 and 22 and 46 and 47, respectively.

During normal operation, both steering circuits operate side by side. The pressure level in the supply line 37 of the second steering circuit is maintained by means of the accumulator 44 which permits rapid steering maneuvers. If the supply line pressure falls below 110 bar, the pressure switch 55 is switched over, whereby the valve 53 blocks the line 52 so that hydraulic oil from the pressure line 36 can be fed into the supply line 37. In the event that the pressure in the pressure line 36 is lower than in the supply line 37, for example as a result of the vehicle being driven slowly or standing still, the non-return valve 38 prevents flowback from the supply line 37. If the pressure in the supply line 37 falls below a very low level, 50 bar, the pressure switch 56 is changed over, whereby the signal lamp 58 is supplied with current from wire 57. At the same time the magnetic valve 14 is also supplied with current by wires 58,61,66, level switch contact 67 and wire 69. Said magnetic valve therewith connects line 13 to the coupling line 70 so that excess flow from the flow regulator 6 of the first steering circuit is led through the spring-loaded non-return valve 71 to the supply line 37 of the second steering circuit and builds up pressure in the same. When the pressure has once again reached 50 bar, the pressure switch 56 is returned to the position shown in the drawing, where current supply of the wire 57 is broken. The signal lamp 58 goes out.

When the pressure in the supply line 37 was less than 50 bar, the pressure switch 55 also supplied the wire 65 to the contact 64 of the relay 63 with current. By means of current supply from the wire 57, the relay 63 was held in drawn position, whereby the contacts 62,64 were closed. The supply of current to the wire 61 and the relay 63 will, thus, continue even after the pressure switch 56 has broken the current supply to the wire 57 due to the fact that the relay contact 64, the wire 65 and the pressure switch 55 form a maintenance circuit. Thus the magnetic valve 14 will lead excess flow from the first steering circuit to the supply line 37 of the second steering circuit also in the interval between 50 and 140 bar in order to quickly build up pressure in the same. When the pressure of 140 bar has finally been reached, the switch 55 is changed over, whereby current supply to the wires 65,61 is interrupted so that the relay 63 releases and current supply to the magnetic valve 14 is interrupted. The wire 54 is simultaneously supplied with current, whereby the magnetic valve 53 switches and opens the line 52.

The contact 67 in the current supply to the magnetic valve 14 functioning as a coupling valve is influenced in relation to the oil level in the tank 4. When the oil level falls below a predetermined minimum value, the connection to the magnetic valve 14 is broken, whereby the first and second steering circuits are separated. At this oil level the hydraulic tank 4 is also divided into two sections by the intermediate wall 76. A line break in either circuit can then lead to the accompanying tank section being emptied. However, the remaining tank section will still contain a sufficient amount of oil to enable the vehicle to be sufficiently maneuvered until the failure has been rectified. Excessively low oil level is indicated by means of the signal lamp 74 being lit.

A line break in the lines 21 or 22 of the first steering circuit entails that the pressure in the return line 9 will be excessively low. This is detected by the pressure guard 16 which changes over and supplies the signal lamp 18 with current. The oil level in the tank 4 will fall so that the signal lamp 74 is also lit. That section of the tank 4 which is associated with lines 3 and 9 will be emptied. However, steering of the vehicles can still be effected with merely the second steering circuit and the steering unit 39.

A line break in steering lines 46 or 47 in the second steering circuit will cause the supply line 37 to be fed from the pump 32 and, under the precondition that the pressure falls below 50 bar, by the coupling line 70 from the first steering circuit as well. The oil level in the tank falls and the level switch 68 activates the signal lamp 74. At the same time, coupling line 70 is broken. The section of the tank 4 which is associated with lines 35 and 42 is emptied. The signal lamp 58 is lit. However, steering can still be effected merely with the use of the first steering circuit and steering unit 7.

The invention is not restricted to the embodiment described above and shown in the drawing, but modifications of the same are feasible within the framework of the accompanying claims. For example, it has been disclosed above that the second steering circuit operates on the piston rod sides of the steering cylinders. This is advantageous as the ground wheel-driven pump 32 and the accumulator 44 can then be designed having smaller dimensions. However, the reversed connection of the steering cylinders is alternatively possible.

As an alternative to that which is illustrated in the drawing, the first steering circuit can be provided with a variable pump and steering unit of the closed center type, for example Danfoss type CN, instead of the stationary pump 1 and open center type steering unit 7. The first steering circuit can be designed to tbe load-detecting by means of the variable pump, for regulation purposes, being connected to the steering lines 21 and 22 through a line 29 (shown dotted) by means of non-return valves 30 and 31, respectively, each valve opening towards the line 29. Another solution for controlling the variable pump is to have a load detecting control canal from the steering unit, that is, a built-in load detection in the steering unit. This entails positive relief in the neutral position.

What we claim is:

1. In a hydraulic steering system for vehicles comprising two double-acting steering cylinders (23,24) and two steering circuits (1,5,7,21,22 and 32,37,38,46,47), each of which has a pressure medium pump (1;32) and a steering unit (7;39) which can be influenced by the steering wheel (20) of the vehicle, to each unit a supply line (5;37) carrying pressure medium from their respective pumps, each having a return flow line (8,9;40,42) and each having a pair of steering lines (21,22;47,46), each steering line of the pair of steering lines is connected to one of the steering cylinders (23,24), said steering unit (7;39), when the steering wheel is turned, metering out a pressure medium flow, the magnitude of which is dependent on the magnitude of the movement of the steering wheel, to its respective steering cylinder line (21 or 22 and 47 or 46); the improvement in which the steering cylinder lines (21,22) in one of the steering circuits (1,5,7) are connected to the rear cylinder spaces of the cylinders (23,24) while the steering cylinder lines (46,47) in the remaining steering circuit (32,37,39) are connected to the forward cylinder spaces of the cylinders (24,23), a pressure detecting means (56) for detecting pressure of the pressure medium and a coupling valve (14), which is also connected (13) to the first steering circuit (1,5,7) and arranged to be influenced by the pressure detecting means (56) when it detects pressure lying below a given minimum level so as to connect the steering circuits so that pressure medium is supplied to said remaining steering circuit from the first steering circuit, being connected to the supply line (37) of said remaining steering circuit (32,37,39).

2. A steering system according to claim 1, characterized in that a three-way flow regulator (6) is arranged in the supply line (5) of said one steering circuit, the excess flow connection of said flow regulator being connected (13) to the coupling valve (14) so that said valve can lead the excess flow to said remaining steering circuit (32,37,39) when excessively low pressure prevails in the same.

3. A steering system according to claim 1, with a pump driven dependent on the rotation of a ground wheel of the vehicle, characterized in that the ground wheel driven pump (32) is the hydraulic pump of said remaining steering circuit (32,37,49).

4. A steering system according to claim 1, characterized in that a pressure medium tank (4) of said remaining steering circuit (32,37,39) has a level detecting means (76,68) arranged to, upon detection of a pressure medium level lower than a predetermined normal level, lock the coupling valve (14) in a position separating the steering circuits.